United States Patent Office 3,444,230
Patented May 13, 1969

3,444,230
ACETYLENIC DIPERESTERS
Ronald L. Friedman and Roger N. Lewis, Pinole, Calif., assignors to Argus Chemical Corporation, a corporation of Delaware
No Drawing. Filed Dec. 3, 1965, Ser. No. 511,354
Int. Cl. C07c *73/06;* C08g *17/003*
U.S. Cl. 260—453                                5 Claims

ABSTRACT OF THE DISCLOSURE

Aliphatic diperesters of alkyne diols having the formula:

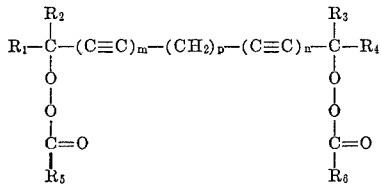

where $R_1$, $R_2$, $R_3$ and $R_4$ are lower hydrocarbon groups, $m$ and $n$ are 0 or 1 with the proviso that their sum is always at least one, $p$ is a positive integer, and $R_5$ and $R_6$ are the same or different aliphatic groups of from 1 to 20 carbon atoms are useful as catalysts for the free radical initiated polymerization of polyesters. Use of these diperesters as catalysts eliminates various distortions in the structure of the finished molded resin product.

---

This invention relates to an improved process for polymerizing polyesters and to certain novel peresters of polyfunctional peroxy alkynes which are especially suitable as catalysts for such polymerization reactions.

The plastics industry makes a great deal of use of polyester materials which are polymerized, cured and molded into a variety of end products. The polymerization reaction is prevalently initiated with organic peroxide free radical catalysts. One problem encountered during curing and molding of polyesters initiated with the presently available peroxides, is the relatively large number of finished articles which must be discarded as unsaleable because of flaws in the resin structure. With most available catalysts, the resin tends to crack, craze and shrink during curing frequently enough to present an economic problem to the molder.

The present invention is based upon the discovery that diperesters of alkyne diols will substantially eliminate the various distortions of the finished molded resin noted above. This advantage in the curing and molding of polyesters has been found to be common to all diperesters of alkyne diols, including diperesters in which the organic group attached to the carbonyl radical is either aromatic or aliphatic.

In discovering the broad principle by which molded polyester distortion is substantially reduced, a new group of compounds was discovered. Thus, within the large group of alkyne diperesters which are useful in the present process, diperesters in which the esterifying group is aliphatic are new compounds. This group of compounds constitutes inventive subject matter in this application in addition to the broad process of curing and molding polyesters with all alkyne diperesters.

Certain of the new aliphatic diperesters of alkyne polyols have been shown to possess unexpected and advantageous properties which set them apart from the other members of the new aliphatic diperester group. The aliphatic diperesters in which the alpha carbon atom of the esterifying group is secondary or tertiary represents a group of preferred catalysts which produce desirable cures of resin within shorter periods of time and/or produce higher peak resin temperatures during the cure than are obtainable with other diperesters and related peroxide catalysts generally known and used for comparable commercial applications. In addition, these preferred branched chain diperesters exhibit the advantageous properties described in copending U.S. patent application, Ser. No. 324,244, filed Nov. 18, 1963, now United States Patent No. 3,264,274, in that they produce resin end products having little or no discoloration.

By way of further definition, the new class of aliphatic diperesters of alkyne diols herein discovered have the following general structural formula:

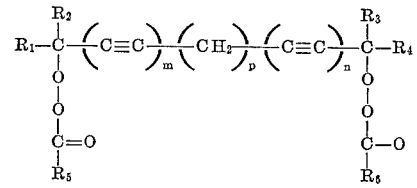

wherein $R_1$, $R_2$, $R_3$ and $R_4$ are hydrocarbon groups, preferably saturated or unsaturated lower hydrocarbon groups, i.e., having from about 1 to 5 carbon atoms, which may be in a straight chain or branched. The $m$ and $n$ are whole number integers from 0 to 1 with the proviso that their sum always be at least 1. The $p$ is a positive whole number integer. $R_5$ and $R_6$ may be the same or different aliphatic groups of from 1 to 20 carbon atoms having noninterfering substituents as desired. Such radicals include propyl, isobutyl, decyl, eicosyl and the like. To take advantage of the solubility of these catalysts with polyesters, it is desirable to limit the $R_5$ and $R_6$ groups to about 12 carbon atoms.

As hereinbefore mentioned, the catalysts useful in the process of this invention also include the diperesters of alkyne diols wherein the perester linkage results from the addition of a carbonyl-containing aromatic group to an organic diperoxide, i.e., wherein $R_5$ and $R_6$ in the above structural formula are hydrocarbons such as similar or dissimilar aryl groups, of from 6 to 20 carbon atoms, for example, phenyl, benzyl and the like.

The diperesters of alkyne diols in which the carbonyl linkage of the diperester is attached to either an aromatic or aliphatic group, when employed to initiate the polymerization of polyesters, substantially eliminate the undesirable distortion or wraping prevalent in present conventional molding operations.

Examples of the compounds of this invention which have been found to initiate the polymerization of polyesters without the attendant disadvantages generally found in the prior art include the following among many others which could be listed:

2,5-dimethyl-2,5-diper(2-ethyl hexanoate) hexyne-3
2,5-diethyl-2,5-diper(2-ethyl hexanoate) hexyne-3
2,5-dimethyl-2,5-diper(octanoate) hexyne-3
2,5-dimethyl-2,5-diperbenzoate hexyne-3
2,5-dimethyl-2,5-diperdecanoate hexyne-3
2,5-dimethyl-2,5-diper(2,2-diethyl hexanoate) hexyne-3
2,5-dimethyl-2-per(2-ethyl hexanoate)-5-peroctanoate hexyne-3
2,5-dimethyl-2,5-diper(pivalate) hexyne-3
2,5-dimethyl-2,5-diper(2-propyl pentanoate)hexyne-3

Generally, prior art peroxides having acetylenic unsaturation are known to be "slow" catalysts, especially in comparison to the corresponding saturated peroxides. By this is meant that the polymerization reactions initiated by the prior art acetylenic peroxides do not reach peak temperature as rapidly as the corresponding prior art saturated peroxides. As a result thereof, curing requires a longer period of time. In this regard, there appears to be a direct correlation between the "half life" of the particular prior art peroxide catalyst and the length of time needed to reach peak temperature, i.e., the "half life," as well as "time to peak temperature," of the acetylenic unsaturated peroxides have generally been substantially longer than the "half life" and the "time to peak temperature" of the corresponding saturated peroxide.

The acetylenic unsaturated peroxides used in the process of this invention, i.e., the diperesters of alkyne diols, usually have a longer "half life" than the corresponding diperester of an alkane diol, in some cases longer by more than a factor of 3; see Table I. However, in spite of this apparent undesirable length of "half life," the diperesters of alkyne diols have been found to be generally "fast" catalysts when compared to the corresponding saturated diperester; see Table II in Example III. Further, as will be seen in Table II, when the branched chain and aromatic diperesters of alkyne diols are compared to each other, it has been found that the branched chain diperesters are much "faster" catalysts.

TABLE I

| | Half-life (hours) at 100° C. |
|---|---|
| 2,5-dimethyl-2,5-diperbenzoate hexane | 6 |
| 2,5-dimethyl-2,5-diperbenzoate hexyne-3 | 22 |
| 2,5-dimethyl-2,5-diper(2-ethyl hexanoate) hexane | 0.15 |
| 2,5-dimethyl-2,5-diper(2-ethyl hexanoate)hexyne-3 | 0.20 |

Therefore, in the preferred aspect of this invention, the organic group attached to the carbonyl linkage of the perester are branched alkyl groupings, i.e., wherein the carbon atom attached directly to the carbonyl group (the alpha carbon) is either a secondary or a tertiary carbon atom. Such catalysts employed to initiate the polymerization of polyesters, not only substantially eliminate distortion and reduce discoloration, they are also "fast," i.e., they shorten the time necessary to reach peak curing temperature and/or increase the peak curing temperature, especially in comparison to prior art organic peroxide catalysts. This desirable attribute has the beneficial effect of completing the curing process in a shorter lapsed time, thereby enabling more product units to be molded during a given time period.

These preferred diperesters of alkyne diols are illustrated by the following structural formula:

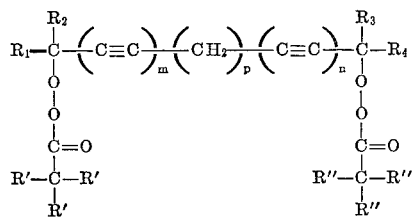

wherein $R_1$, $R_2$, $R_3$, $R_4$, $m$ and $n$ have the definitions given above, $p$ is preferably a positive whole number integer from 0 to 4 and R' and R'' are selected from the group containing the hydrogen atom and alkyl radicals, provided that at least 2 R's and 2 R''s are alkyl radicals. Hence, it will be seen that each carbon atom attached directly to a carbonyl group, i.e., the alpha carbon atom, is either a secondary or tertiary carbon atom.

As before, it is preferred that the three R's and the three R''s total not more than about 19 carbon atoms so each of the alkyl groups attached directly to the carbonyl groups are limited to about 20 carbon atoms.

The organic diperesters of the invention may be prepared by the conventional techniques generally known to one skilled in this art. These include the reaction of a dihydroperoxide of the corresponding dihydroxy alkyne with a carboxylic acid (R—COOH), wherein the organic radical (R) corresponds to the hydrocarbon radical desired in the diperester catalyst. It is preferred to employ an acid halide, such as a chloride, of the corresponding carboxylic acid in the reaction with the dihydroperoxide to form the ester. In addition, the corresponding anhydride of the carboxylic acid can be utilized.

The esterification reaction can be executed in a suitable solvent such as chloroform. However, there are many suitable reactants that may require no solvent. When an acid halide is used, an organic or inorganic base is employed to neutralize the acid liberated in the esterification reaction. The base is suitably employed in excess. The reaction proceeds fairly rapidly in most cases and is complete within several hours. In most instances, no heat need be applied, although in the formation of certain of the catalysts, slight warming may be desirable.

Normally, an ester group will be desired at both sites of the diperoxide molecule. Therefore, at least 2 moles of, for example, the acid halide will be used for each mole of the hydroperoxy alkyne. If mixed esters are sought, one mole of each of the acid halides selected can be reacted with one mole of the hydroperoxy alkyne.

The polymerization process of this invention is capable of wide application to conventional polyesters which polymerize when subjected to peroxide-type catalysts. Examples of this broad grouping, well known to those skilled in this art, are illustrated in the McGraw-Hill Encyclopedia of Science and Technology, vol. 10, pp. 466–468, 1960.

In commercial application, conventional curing and molding of polyesters are usually accomplished in molds which are maintained at elevated temperatures, such as 180–250° F., to reduce the reaction time to a minimum.

To further illustrate the novel process of this invention, the following examples are provided. It should be understood that the details thereof are not be regarded as limitations as they may be varied as will be understood by one skilled in this art.

Example I.—Preparation of 2,5-dimethyl-2,5-dihydroperoxy hexyne-3

To a cold mixture (—2° C.) of 52.5 grams of 50% hydrogen peroxide and 69 grams of 95.5% sulfuric acid was added in small portions over a period of one hour, 50 grams of 2,5-dimethyl-2,5-dihydroxy hexyne-3. Mechanical stirring was continued for four hours while the temperature was maintained between —0.5° and +0.5° C. The mixture was then diluted with an equal volume of saturated sodium sulfate and extracted with ether. The ether extract was dried and the ether removed under reduced pressure.

The yield was 84% of the theoretical and had a purity of 83% based on active oxygen.

Example II.—Preparation of acetylenic dieperesters (a) Preparation of 2,5-dimethyl-2,5-diper (2-ethyl hexanoate) hexyne-3.

257 grams of ice and 152.61 grams of 50% sodium hydroxide were mixed together and cooled to about 13°

C. 52.38 grams of 2,5-dimethyl-2,5-dihydroperoxy hexyne-3 (95.2% purity) was added to the stirred mixture. Thereupon the temperature rose to about 20° C. 159.76 grams of 2-ethyl hexanoyl chloride (87.5% purity) was added very rapidly and the temperature maintained at 40° C. The mixture was rapidly stirred during this addition of the acid chloride and continued until the end of the reaction. The addition time of acid chloride was about 15 minutes. The reaction continued for another 15 minutes. The reaction mixture was then cooled to about 20° C. and sodium chloride and ether added to aid phase separation. The organic layer was washed twice with dilute potassium hydroxide (pH 11), thrice with water, once with dilute sulfuric acid (pH 1), and twice more with water. The resulting product was thereafter dried with sodium sulfate, filtered and concentrated under vacuum.

The product had a purity of 96.5% and was 78.8% of the theoretical yield.

(b) Preparation of 2,5 - dimethyl - 2,5 - diperbenzoate hexyne-3.

In a process similar to Example II(a), 2,5-dimethyl-2,5-diperbenzoate hexyne-3 was prepared from benzoyl chloride in a yield of about 80% of the theoretical, with a purity of about 85%.

(c) Preparation of 2,5 - dimethyl - 2,5 - diperdecanoate hexyne-3.

In a process similar to Example II(a), 2,5-dimethyl-2,5-diperdecanoate hexyne-3 was prepared from decanoyl chloride in a yield of about 75% of the theroetical, with a purity of about 80%.

Example III.—Polymerization initiation

As previously set forth, the compounds of the present invention are most useful in catalyzing reactions that are initiated by the presence of free radicals. The diperesters of alkyne diols, catalysts which form free radicals, initiate the polymerization of polyesters. These diperesters catalysts are employed in the same manner as other known peroxides.

The polymerized resins listed in Table II below were obtained in the following manner:

To 99.5 grams of the polymerizable polyester was added 0.5 grams of the diperester. Each of the mixtures were placed in contact with a mold and placed in an oven which had been preheated to the temperature indicated, and the mixture retained therein until cured.

It will be appreciated by one of skill in this art that there is no peroxide catalyst which has totally superior properties when employed with all types of commercially available polyester resins under all conditions. However, it will be seen from the data in the above table that the diperesters of this invention, and especially the preferred diperesters containing a branched alkyl group, exhibited properties such as peak temperature and/or time to peak temperature, which were generally superior to those found for the corresponding diperester of an alkane diol.

Although the foregoing invention has been described in some detail by way of illustration and example for purposes of clarity of understanding, it is to be understood that certain changes and modifications may be practiced within the spirit of the invention as limited only by the scope of the appended claims.

What is claimed is:

1. A diperester of a dihydroperoxyalkyne of the formula:

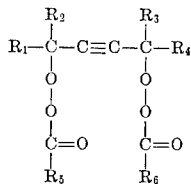

wherein $R_1$, $R_2$, $R_3$, $R_4$ are alkyl groups of 1–5 carbon atoms; and $R_5$ and $R_6$ are selected from the group consisting of alkyl groups of 3–12 carbon atoms.

2. A diperester in accordance with claim 1 wherein $R_5$ and $R_6$ are alkyl groups in which the carbon atom attached to the carbonyl carbon atom is secondary or tertiary.

3. A diperester in accordance with claim 1 wherein $R_1$, $R_2$, $R_3$, and $R_4$ are methyl groups.

4. A diperester in accordance with claim 3 wherein $R_5$ and $R_6$ are nonyl groups.

5. A diperester in accordance with claim 3 wherein $R_5$ and $R_6$ are groups having the formula:

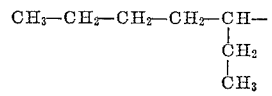

TABLE II

| Catylyst | Plaskon P.E. 942 | | | Hetron 92 | | | Plaskon P.E. 461 | | |
|---|---|---|---|---|---|---|---|---|---|
| | Initial mold temp. (° F.) | Peak temp. (° F.) | Time to peak temp. (min.) | Initial mold temp. (° F.) | Peak temp. (° F.) | Time to peak temp. (min.) | Initial mold temp. (° F.) | Peak temp. (° F.) | Time to peak temp. (min.) |
| 2,5-dimethyl-2,5-diper (2-ethyl hexanoate) hexane. | 180 / 212 / 250 | 412 / 394 / 442 | 32.5 / 15.5 / 11.2 | 250 | 410 | 10.0 | 250 | 430 | 8.5 |
| 2,5-dimethyl-2,5-diper (2-ethyl hexanoate) hexyne-3. | 180 / 212 / 250 | 419 / 403 / 428 | 29.5 / 16.0 / 9.5 | 250 | 406 | 9.0 | 250 | 424 | 9.4 |
| 2,5-dimethyl-2,5-diper-decanoate hexyne-3. | 180 / 212 | 340 / 372 | 66.5 / 35.5 | | | | | | |
| 2,5-dimethyl-2,5-diper-benzoate hexane. | 212 | 383 | 46.0 | | | | | | |
| 2,5-dimethyl-2,5-diper-benzoate hexyne-3. | 212 | 372 | 39.5 | | | | | | |

The preceding table is a comparison of reaction results, i.e., the time to peak temperature and peak temperature, produced with polyesters when subjected to variations in the initial oven, i.e., mold temperature. Visual observance revealed a substantially complete lack of distortion in the resin products wherein the curing process was catalyzed with the diperesters of alkyne diols. In contrast, the reaction products catalyzed with the diperesters of alkane diols were generally irregularly formed and distorted. In addition, the diperesters of both alkyne and alkane diols, having a branched alkyl grouping attached to the carbonyl radical, produced extremely "fast" reactions.

References Cited

UNITED STATES PATENTS 3,264,274  8/1966  Leveskis _____ 260—80
3,117,166  1/1964  Harrison et al. _____ 260—453 X

FOREIGN PATENTS 1,234,725  2/1967  Germany.
175,950  12/1965  U.S.S.R.

CHARLES B. PARKER, *Primary Examiner.*

S. T. LAWRENCE, *Assistant Examiner.*

U.S. Cl. X.R.

260—75, 76, 77